INVENTORS
OTTO J. ADLHART
VIRENDRA V. TANNA

BY

ATTORNEY

United States Patent Office 3,575,718
Patented Apr. 20, 1971

3,575,718
COMPOSITE ELECTROLYTE MEMBER
FOR FUEL CELL
Otto J. Adlhart, Newark, and Virendra V. Tanna, Parlin, N.J., assignors to Engelhard Minerals & Chemicals Corporation, Newark, N.J.
Filed Sept. 23, 1968, Ser. No. 761,682
Int. Cl. H01m 27/00, 11/00
U.S. Cl. 136—86
14 Claims

ABSTRACT OF THE DISCLOSURE

Thin flexible fuel cell electrolyte members, which also serve as effective barriers between the cathode and anode compartments in a fuel cell and which are useful for fuel cells operating in the temperature range of 80°–250° C. are composite structures having two dissimilar layers, each consisting of a matrix and a concentrated liquid acid immobilized in such matrix. The matrix of each layer is comprised of a fluorocarbon gel and inert filler particles. The matrix of one layer has carbon powder as an essential component. The second, which is a thinner layer contains no carbon powder, forms a dielectric barrier between the cathode and the layer containing a carbon-powder.

BACKGROUND OF THE INVENTION

A fuel cell is an electrochemical device in which the chemical energy of a combustible fuel is electrochemically converted into electrical energy. Basically, it is composed of an anode, a cathode, and an electrolyte. The electrolyte serves as an ionic conductor between the electrodes. Electrical energy generated in the cell is povided and utilized through electron conductors forming an external circuit. For efficient cell operation, the electrolyte should have high eyectrolytic conductivity and low electronic conductivity. Any electronic conductivity in the electrolyte diminishes the power output of the cell. This invention concerns new and improved electrolyte members for fuel cells. These electrolyte members are useful for cells operating in an intermediate temperature range, i.e. about 80°–250° C.

Advantages of operating fuel cells in this temperature range are well known. For example, as temperature increases the electrochemical reaction rates at the electrodes are accelerated and the cells can be operated at higher current densities and with greater efficiency than those operated at normal room temperatures. In fuel cells where $H_2O$ is a product, at elevated cell temperatures, the product $H_2O$ and the heat generated in the cells as a result of cell resistance and electrode polarization are more easily removed. However, one of the major problems in intermediate temperature cells, especially in acid cells, is the development of electrolytes capable of operating in such temperature range without deteriorating.

Liquid and solid electrolytes for fuel cells are well known. Liquid electrolytes, e.g. strong acids such as concentrated $H_2SO_4$ and $H_3PO_4$, have the advantage of minimizing power losses in the cell caused by polarization and electrolyte resistance. However, when the temperature of a fuel cell is raised, it is difficult to contain the free electrolyte between the electrodes. Solid thin electrolytes, e.g. inorganic and organic ion exchange membranes, do not present the problem of electrolyte confinement and they also permit closer spacing of the electrodes while providing effective separation between the anode and cathode, thus enabling more favorable cell design. But generally, these solid electrolytes have higher electrical resistance.

In co-pending application S.N. 491,948 filed Oct. 1, 1865, now Pat. 3,453,149, a thin flexible electrolyte member is disclosed which is comprised of a liquid electrolyte immobilized in a matrix composed of an inert inorganic compound bonded with a fluorocarbon polymer formed by coagulation into a network structure. This structure combines the advantages of a free liquid electrolyte and a solid ion exchange type electrolyte. One marked advance of the electrolytes disclosed in said co-pending application over known electrolyte membranes is that although they are exceptionally thin they serve as effective gas barriers between the anode and cathode compartments. The present invention is an improvement on the previously disclosed electrolyte members. This improvement is brought about primarily by the use of carbon powder as a filler in the fluorocarbon network structure. The high surface area of many carbon powders and the excellent stability of carbon powder in acids permits the preparation of matrices with higher acid content and consequently lower electrolytic resistance. Yet due to the presence of carbon such membranes also have an undesirable electronic conductivity which may depress the cell output. This disadvantage is overcome by composite membranes of the present invention.

The electrolyte members of the present invention are thin flexible composite structures having two dissimilar layers, each layer consisting of a matrix and a liquid acid electrolyte immobilized in such matrix. These composite structures have high electrolytic conductivity, low electronic conductivity, and stability when used in intermediate temperature cells. Fuel cells using such electrolytes have iproved power output and long life.

THE INVENTION

The improved electrolyte member of this invention is a thin flexible composite structure having two dissimilar layers, each layer having a matrix and a concentrated liquid acid immobilized in such matrix. The matrix of one layer is comprised of a fluorocarbon polymer gel and carbon powder. This layer may also contain inert inorganic compounds in the form of fine powders. The second layer is a thinner layer, the matrix of which is comprised of a fluorocarbon polymer gel and inert inorganic compounds in the form of fine powders, however, no carbon powder is present in this second layer.

The electrolyte member consists of these two layers immediately adjacent to each other in a composite sheet, and the electrolyte body is confined in a fuel cell between an anode and a cathode and in contact therewith, and disposed so that the carbon powder-containing layer is adjacent to the anode and the thinner dielectric layer which is free of carbon powder is adjacent to the cathode. Positioned in this way, the thinner layer forms an electrically insulating barrier between the carbon powder-containing layer and the cathode.

In addition to the dielectric contribution of the thinner layer, it also prevents degradation of the carbon powder-containing layer by oxidation. It has been found that when placed immediately adjacent to the cathode, and in contact with the platinum metal catalyst the carbon powder-containing layer degenerates on operating the cell at temperatures over about 60° C. By placing the layer free of carbon powder as a barrier between the carbon powder-containing layer and the cathode—the problem of degradation of the electrolyte member at the cathode is avoided.

The total thickness of the composite electrolyte member is about 5–50 mils, typically about 10–30 mils. The thicker carbon powder-containing layer is typically about 10–30 mils, and the thinner barrier layer is typically about 2–10 mils. Roughly, the thicker carbon powder-containing layer is about 5–10 times the thickness of the thinner layer. For example, in a 20 mil thick electrolyte member the carbon powder-containing layer is suitably about 17 mils and the thinner cathode barrier layer about 3 mils thick.

Both the relative thicknesses of the two layers of the composite structure and the total thickness are important. In the electrolyte member, it is the thicker carbon powder-containing layer with immobilized liquid electrolyte therein that contributes the desirably high electrolytic conductivity and stability of the membrane, and it is the thinner barrier component of the electrolyte member that contributes the dielectric property, i.e. the low electronic conductivity. It is the relative thicknesses of the two layers in the composite structure that gives it the combination of high electrolytic, low electronic conductivity and stability. This desirable combination of properties in the very thin composite structure, which is stable at the desired operating range and which provides effective separation between the anode and cathode, makes possible more favorable cell design with respect to weight, dimensions, and cell efficiency.

As noted above, the thicker layer of the matrix has as an essential component carbon powder bonded in a fluorocarbon polymer gel. This carbon powder-containing layer may also contain inert inorganic compounds, that is the compounds must be essentially inert to the acid, e.g. hot concentrated $H_3PO_4$, under operating conditions of the cell. These inert compounds are in the form of line powders and one or more compounds may be present. They are thought to prevent deformation of the matrix in an assembled cell where the assembly pressure may be as high as 50 p.s.i. Examples of suitable compounds are oxides, sulfates, phosphates, borides, and carbides of boron, zirconium, tantalum, tungsten, chromium, and niobium, and combinations thereof. The thinner cathode barrier has as essential components the fluorocarbon polymer gel and inert inorganic compounds as defined above.

The type of carbon powder used is not critical, however, a surface area of at least about 1 square meter/gram (m.$^2$/g.) is desirable. Examples of suitable carbon powders are acetylene black, channel blacks or finely ground charcoal powders.

As noted above the inorganic particles must be essentially inert to the cell environment. They are chosen for their ability to prevent deformation of the electrolyte member and for their ability to retain the immobilized acid during the operation of the cell.

The fluorocarbon polymer bonding the inert inorganic particles and/or carbon powder is also inert to the reactants and the liquid acid electrolyte, and it is thermally stable at the operating temperatures of the cell. In addition to bonding the particles together to form a coherent flexible material, the polymer must help retain the free acid. In fabricating the electrolyte structure, it is important that the fluorocarbon polymer be used in the form of an emulsion rather than a powder. When used as a powder, the polymer tends to retain a particulate form. When used as an emulsion, it forms a network which entraps the free acid. This network structure coagulated from the emulsion is referred to herein as a gel. An example of suitable fluorocarbon polymers is polytetrafluoroethylene (PTFE).

The liquid acid electrolyte may be phosphoric or sulfuric acid. The acid may be in aqueous solution. The concentration of the acid in the fuel cell will depend on operating conditions of the cell, e.g. the operating temperature and the relative humidity of the gases entering the fuel cell. Depending on these conditions, the member will take up or give off water until an equilibrium is established. Typically, however, the concentration is above 85% for phosphoric acid and between 25–35% for sulfuric acid. Phosphoric acid is the preferred electrolyte.

The carbon powder-containing layer, as indicated above, is composed of three or four components, a matrix of inert inorganic compounds in the form of fine powders and/or carbon powder bonded with a fluorocarbon polymer gel, and a liquid acid immobilized in the matrix. The concentrations of the components are adjusted to obtain an electrolyte member with optimum characteristics of electrolytic conductivity, flexibility, stability, and ability to retain free acid. Generally the matrix of the thicker layer contains (by weight) 5–90% carbon powder, 0–80% inert inorganic compound in the form of fine powders, 5–90% fluorocarbon polymer gel. The immobilized acid content is 30–70% (by weight). In one embodiment a carbon powder-containing layer contains carbon powder, zirconium phosphate powder, Teflon gel and phosphoric acid.

The thinner layer, which serves as a barrier between the carbon-containing layer and the cathode and has high electronic resistance, is composed of three components: a matrix of an inert inorganic compound in the form of a fine powder bonded with a fluorocarbon polymer gel and a liquid acid immobilized in the matrix. The concentrations of the components in the matrix on an acid free basis are generally in the range of (by weight) 70–95% inert inorganic compound and 5–30% fluorocarbon polymer gel. The immobilized acid content is about 30–70% by weight. A typical thinner barrier layer is composed of zirconium phosphate powder, Teflon gel and phosphoric acid.

The composite electrolyte members of this invention have exceptionally good electrical properties, i.e. high electrolytic and low electronic conductivity. The electrolytic conductivity of such members was determined in an operating cell by measuring the internal resistance of the cell. This internal resistance of the cell is essentially attributable to the resistance of the electrolytic member. Using a cell of dimensions 8.5 cm. length x 8.5 cm. width and an electrolyte member of 0.5 mm. thickness, the resistance at about 150° C. was found to range between 0.003 and 0.02 ohm. On this basis the specific resistance at ~150° C. of the electrolyte members was calculated as 4 to 29 ohm-cm. The electrical resistance of such members was also determined after the acid was removed by leaching in water, and in all cases was found to be above 1000 ohms.

DRAWINGS

Figure 1:
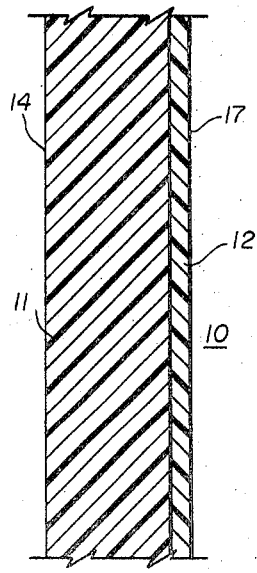
FIG. 1 is an enlarged sectional diagram of a composite electrolyte member of this invention, which shows the dissimilar layers.

FIG. 1 represents an enlarged section of an embodiment of this invention and shows a composite electrolyte member 10 composed of a thicker layer 11, 17 mils in thickness, and, for example, composed of a matrix of carbon powder and zirconium phosphate powder bonded in network structure with PTFE polymer and 85–100% $H_3PO_4$ immobilized in said matrix, and a thinner cathode barrier layer 12 of 3 mils thickness which is composed, for example, of a matrix of zirconium phosphate powder bonded in a network structure with PTFE polymer, and 85–100% $H_3PO_4$ immobilized in said bonded matrix.

Figure 3:
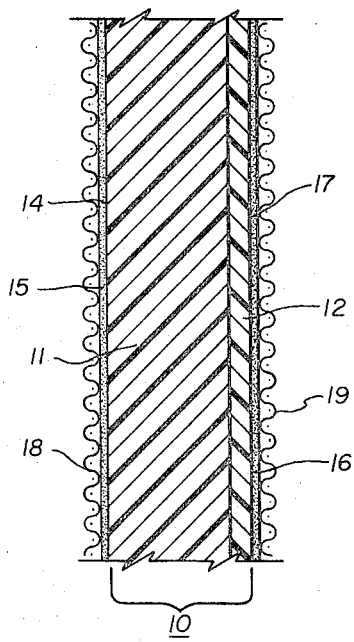
FIG. 3 is a fragmentary enlarged sectional view showing the position of the composite electrolyte member of FIG. 1 with respect to the anode and cathode.
Figure 2:
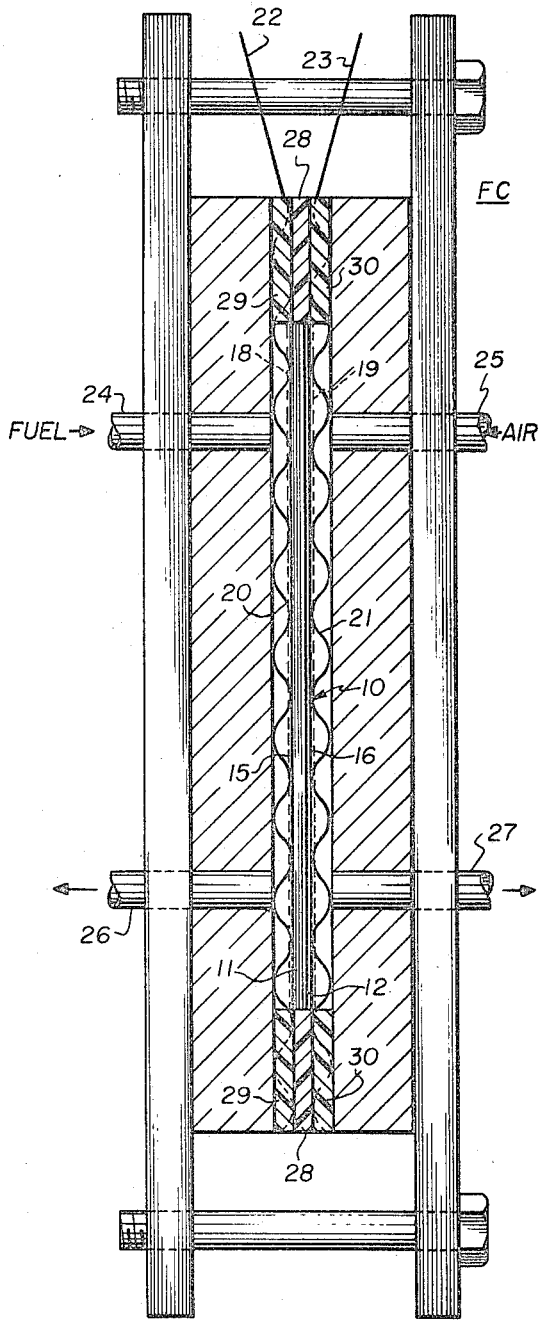
FIG. 2 is an elevational sectional view through a fuel cell equipped with the composite electrolyte member of FIG. 1.

FIGS. 2 and 3 shows the composite electrolyte member 10 positioned between anode catalyst 15 and cathode catalyst 16 in a fuel cell (FC). The anode catalyst 15 is a layer of platinum black embedded in surface 14 of the carbon-containing layer 11 of electrolyte member 10. The cathode catalyst 16 is a layer of platinum black embedded in surface 17 of thin cathode barrier layer 12 of electrolyte member 10. Fine mesh screens 18 and 19, typically of 80 mesh are secured over the anode and cathode catalyst layers 15 and 16, respectively, for collecting electrons. Coarse mesh platinum screens 20 and 21 are secured over the fine mesh screens 18 and 19. Current terminals 22 and 23 secured to the coarse screen 20 and 21 are part of an external circuit (not shown).

Supply conduits 24 and 25 supply fuel and oxidizer to the anode and cathode respectively, and discharge conduits 26 and 27 are outlets for the reaction products effluent gases. Teflon gasket 28 is shown at the top and bottom of the composite electrolyte member 10. Portions 29 and 30 of the current collection screens 20 and 21, respectively, are shown filled with Teflon to seal off the fuel and air compartments.

In operation, a fuel, for instance a hydrogen gas, is supplied to the anode catalyst 15 through supply conduit 24, and an oxidizing gas, e.g. air is supplied to the cathode through conduit 25 as a result of electrochemical reaction, electrons are liberated at the anode with the formation of protons. The electrons are collected by platinum collection screen 18 and drained off through platinum conduction screen 20. At the cathode the electrochemical reaction proceeds as follows:

$$\tfrac{1}{2} O_2 + 2e + 2H^+ \rightarrow H_2O$$

The protons needed in the reaction are supplied by migration through the composite electrolyte member from the anode. The water generated at the cathode is removed by excess flow of oxidizer gas. When the fuel cell is in operation current flows through leads 22 and 23 in the external circuit (not shown).

Example I.—Preparation of composite electrolyte member

This example illustrates the preferred method of preparing the composite electrolyte membranes of this invention and is not intended to limit the materials that may be used herein.

(a) Materials: All materials employed in this illustration of the invention are commercially available chemicals. The Teflon emulsion T–30 is a product of Du Pont. Commercial zirconia powder is employed which is converted to zirconium phosphate on reaction with the phosphoric acid in the compositions outlined below.

(b) Barrier layer composition: The following ingredients were used to prepare the barrier layer:

Zirconium oxide—90 g.
$H_3PO_4$—250 g.
Teflon emulsion T–30—50 cc.

(c) Carbon-containing layer composition: Carbon powder-containing layers of various compositions were made from zirconia, Teflon emulsion, carbon powder and 85–100% $H_3PO_4$. Table I shows the percentages carbon powder, Teflon emulsion and zirconia used to make representative matrices.

TABLE I

| Sample: | Percent C | Percent T–30 | Percent $ZrO_2$ |
|---|---|---|---|
| A | 10 | 90 | |
| B | 25 | 75 | |
| C | 69 | 31 | |
| D | 85 | 15 | |
| E | 4 | 41 | 55 |
| F | 6 | 29 | 65 |
| G | 18 | 51 | 31 |
| H | 24 | 47 | 29 |
| I | 33 | 41 | 26 |
| J | 6 | 40 | 54 |

The acid content of these materials expressed as 100% $H_3PO_4$ ranges from 40–65% by weight. The acid content was determined by titration after leaching with water.

(d) Preparation of composite: Preparation of the composite structures involves first the fabrication of the two separate layers. Each layer is first made by mixing the components of the respective layers, heating the mixture to about 100° to 250° C. to coagulate the polymer, and then shaping the resultant material e.g. by rolling or pressing. The two separately prepared layers are then pressed or rolled together to the desired thickness.

Example 2.—Performance of composite electrolyte member

Composite electrolyte members were made by rolling together samples of Table I with the layer free of carbon powder described in Example I in a thickness ratio of about 7:1.

The composite electrolyte members were tested in a fuel cell similar to that shown in FIG. 2 using platinum black as the anode and cathode catalysts. Pure $H_2$ was fed to the anode. Air was fed to the cathode. The cell was operated at a temperature of about 145° C. and the cell performance and the specific resistance of the electrolyte membrane based on the cell resistance were determined. The resistance measurements were made with a Keithly Ohmmeter Model 502. The total cell size was 8.5 x 8.5 cm. and the thickness of the electrolyte member 0.5 mm. The results are given in Table II.

TABLE II

[Cell performance and CEM [1] resistance]

| CEM [1] | Cell voltage at 100 ma./cm.² (volt) | Cell resistance at 150°±5° C. (ohms) | Specific resistance of CEM [1] at 150°±5° C. (ohm-cm.) |
|---|---|---|---|
| J–C | 0.745 | 9–13×10⁻³ | 13–19 |
| G–C | 0.795 | 5.7–8×10⁻³ | 8.3–11.6 |
| H–C | 0.765 | 10–13×10⁻³ | 14.5–19 |

[1] CEM=Composite Electrolyte Member, in which the carbon containing layer of the composite, J, G, and H correspond to the samples in Table I.

Example 3

A composite electrolyte member similar to sample J of Example 2 was tested in a fuel cell as in Example 2 using impure $H_2$, containing 22.1% $CO_2$, 3.05% CO, 0.35% $CH_4$ and the balance $H_2$ as the fuel. The cell potential was measured at various current densities ranging to about 180 ma./cm.². The results are shown in FIG. 4.

Figure 4:
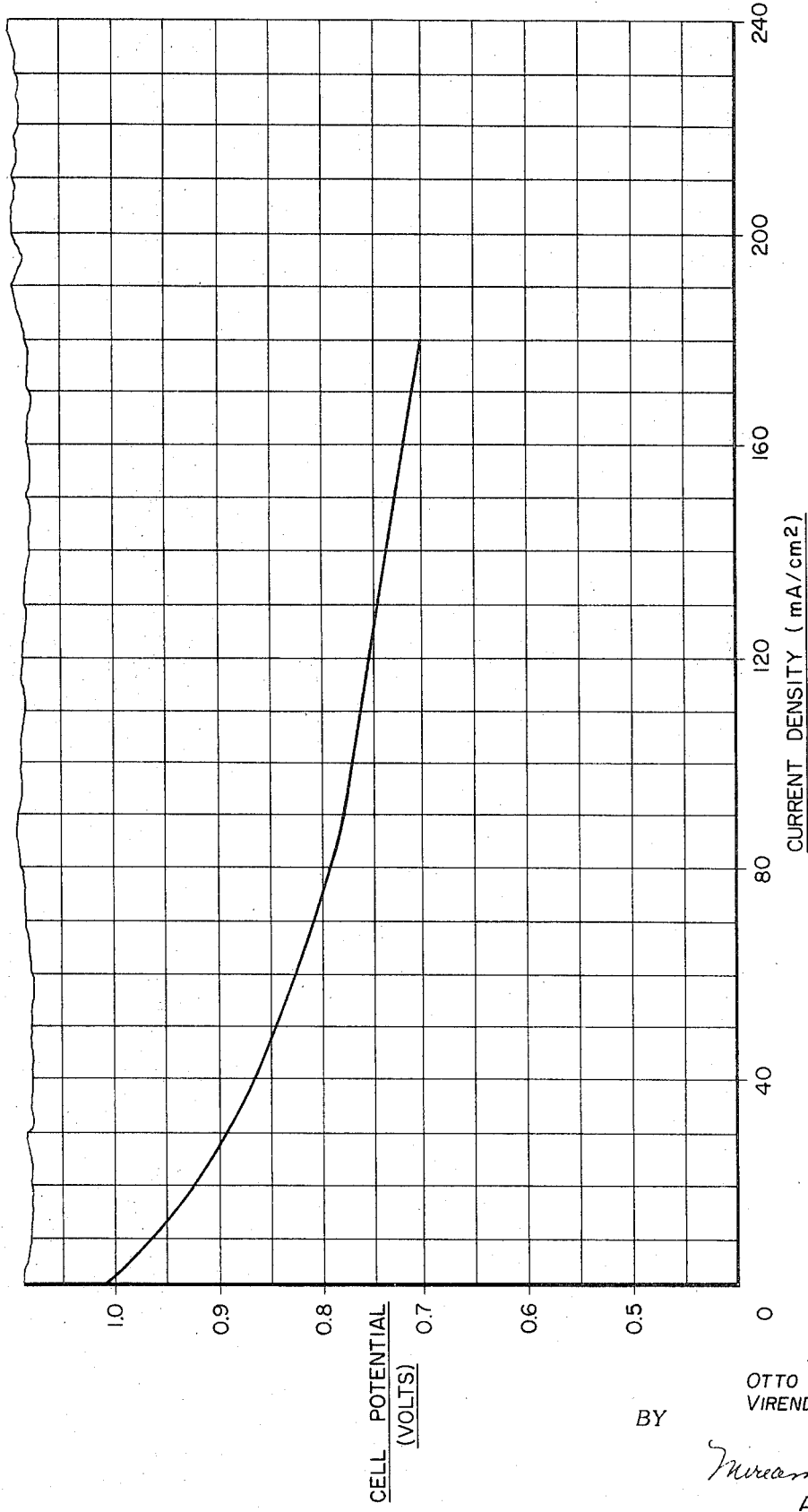
FIG. 4 shows the performance of a fuel cell equipped with a composite electrolyte member of this invention.

FIG. 4 shows that the fuel cell using a composite electrolyte member of this invention could be operated at high current densities with a high cell potential and low polarization. For example at a current density of 80 ma./cm.² the cell potential was about 0.79 volt, and at 120 ma./cm.² the cell potential was 0.75 volt.

Example 4

A composite electrolyte member similar to that described in Example 3 was used in a fuel cell tested under the same conditions given in Example 3 except that the test was performed with the current density maintained at 100 ma./cm.² and the cell potential was determined as a function of time. This life test was run for a period of about 2500 hours. The initial cell potential was 0.76 volt and 0.69 volt at the end of the run.

Using pure hydrogen as fuel the corresponding voltages at 100 ma./cm.² were 0.78 volt at the beginning of the run and 0.73 volt after 2500 hours of testing.

We claim:
1. A fuel cell comprising an anode, a cathode, an electrolyte member confined between said anode and cathode, means for supplying fuel to the anode, and means for supplying an oxidant to the cathode, said electrolyte member consisting of two dissimilar layers immediately adjacent to each other in a composite sheet, each of said layers consisting essentially of a matrix with a liquid acid immobilized in said matrix, the matrix of one layer being comprised of a carbon powder and a fluorocarbon polymer gel, and the matrix of the second of said layers being comprised of an inert inorganic compound in the form of a fine powder and a fluorocarbon polymer gel, said compound is an oxide, sulfate, phosphate, boride, or carbide of zirconium, tantalum, tungsten, boron, chromium, or niobium; the second of said layers being free of carbon powder and being thinner than the carbon powder-containing layer; and said electrolyte member being disposed in the fuel cell with the carbon powder-containing layer adjacent to the anode and the thinner layer adjacent to the cathode.

2. A fuel cell of claim 1 wherein the carbon powder has a surface area of at least 1 square meter per gram.

3. A fuel cell of claim 1 wherein the matrix of the carbon powder-containing layer contains in addition an inert inorganic compound in the form of a fine powder, said compound is an oxide, sulfate, phosphate, boride, or carbide of zirconium, tantalum, tungsten, boron, chromium, or niobium.

4. A fuel cell of claim 3 wherein the matrix of the carbon powder-containing layer consists essentially of 5–90% carbon powder, 0–80% inert inorganic compound, and 5–90% fluorocarbon polymer gel, and wherein the matrix of the thinner layer consists of 70–95% inert inorganic compound and 5–30% fluorocarbon polymer gel.

5. A fuel cell of claim 4 wherein the liquid acid immobilized in said matrices is about 30–70% by weight.

6. A fuel cell of claim 5 wherein the total thickness of the electrolyte member is 5–50 mils and the thicker carbon powder-containing layer is 5–10 times the thickness of the thinner layer.

7. A fuel cell of claim 5 wherein the inert inorganic compound is zirconium phosphate, the fluorocarbon polymer is polytetrafluoroethylene, and the immobilized acid is 85–100% phosphoric acid.

8. A fuel cell of claim 6 wherein the composite electrolyte member has a specific cell resistance at about 150° C., as determined in an operating cell, of 4 to 29 ohm-cm.

9. A thin flexible composite electrolyte member for a fuel cell consisting of two dissimilar layers immediately adjacent to each other in a composite sheet, each layer consisting of a matrix with a liquid acid immobilized in said matrix, the matrix of one layer being comprised of a carbon powder, a fluorocarbon polymer gel, and the matrix of the second of said layers being comprised of an inert inorganic compound in the form of a fine powder and a fluorocarbon polymer gel, said compound is an oxide, sulfate, phosphate, boride, or carbide of zirconium, tantalum, tungsten, boron, chromium, or niobium; the second of said layers being free of carbon powder and being thinner than the carbon-powder containing layer.

10. A thin flexible composite electrolyte member of claim 9 wherein the carbon powder has a surface area of at least 1 square meter per gram.

11. A thin flexible composite electrolyte member of claim 9 wherein the matrix of the carbon powder-containing layer contains in addition an inert inorganic compound in the form of a fine powder, said compound is an oxide, sulfate, phosphate, boride, or carbide of zirconium, tantalum, tungsten, boron, chromium, or niobium.

12. A thin flexible composite electrolyte member of claim 9 wherein the total thickness of the electrolyte member is 5–50 mils and the thicker carbon powder-containing layer is 5–10 times the thickness of the thinner layer.

13. A thin flexible composite electrolyte member of claim 12 which has a specific electrolytic resistance of about 150° C. of 4 to 29 ohm-cm.

14. A thin flexible composite electrolyte member of claim 11 wherein the inert inorganic compound is zirconium phosphate, the fluorocarbon polymer is polytetrafluoroethylene, and wherein the liquid acid is phosphoric acid with a concentration of more than 85% by weight.

References Cited
UNITED STATES PATENTS

| | | | |
|---|---|---|---|
| 3,368,922 | 2/1968 | Salyer | 136—153X |
| 3,453,149 | 7/1969 | Adlhart et al. | 136—153 |

WINSTON A. DOUGLAS, Primary Examiner

D. L. WALTON, Assistant Examiner

U.S. Cl. X.R.

136—146, 153